UNITED STATES PATENT OFFICE.

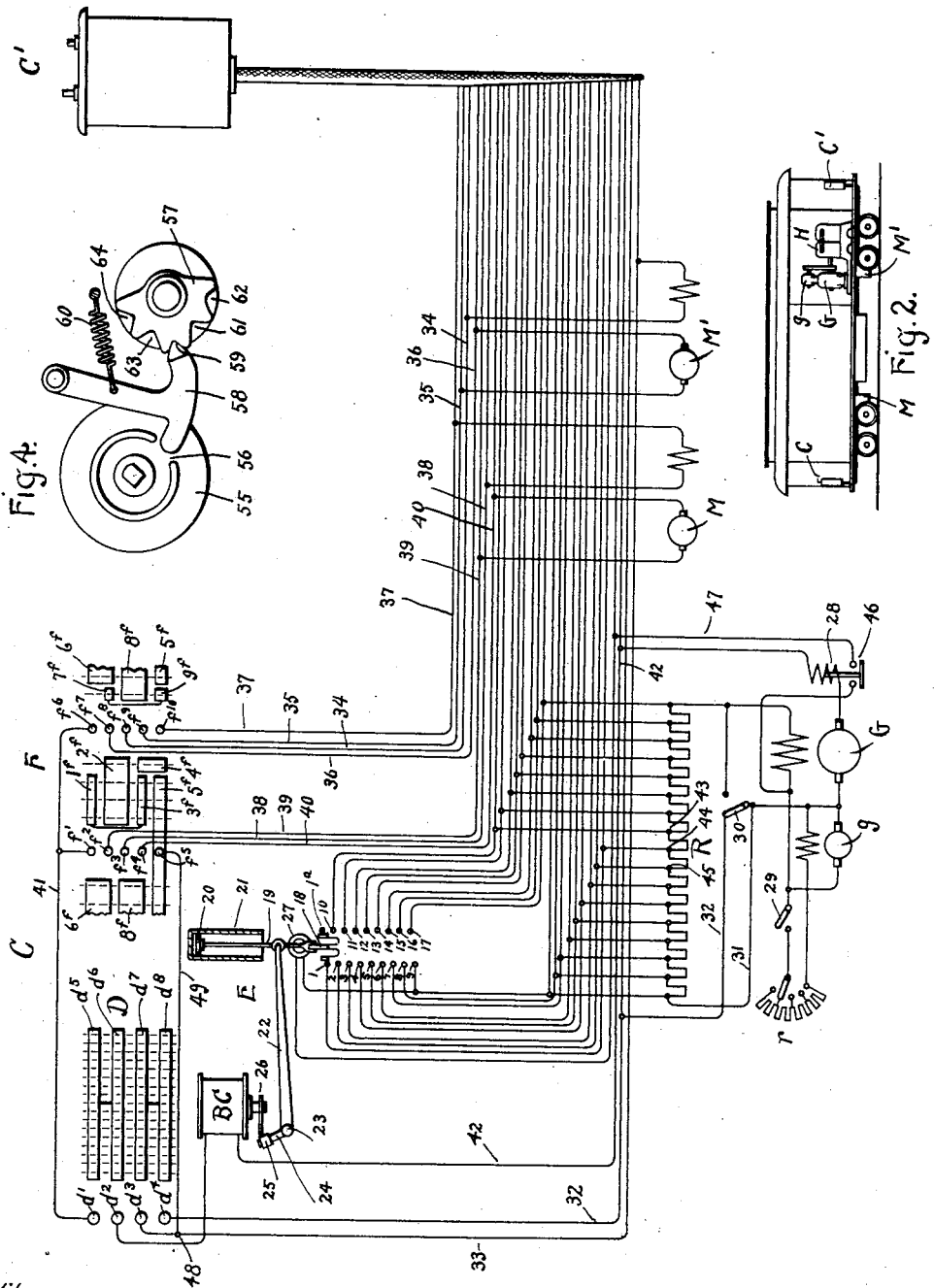

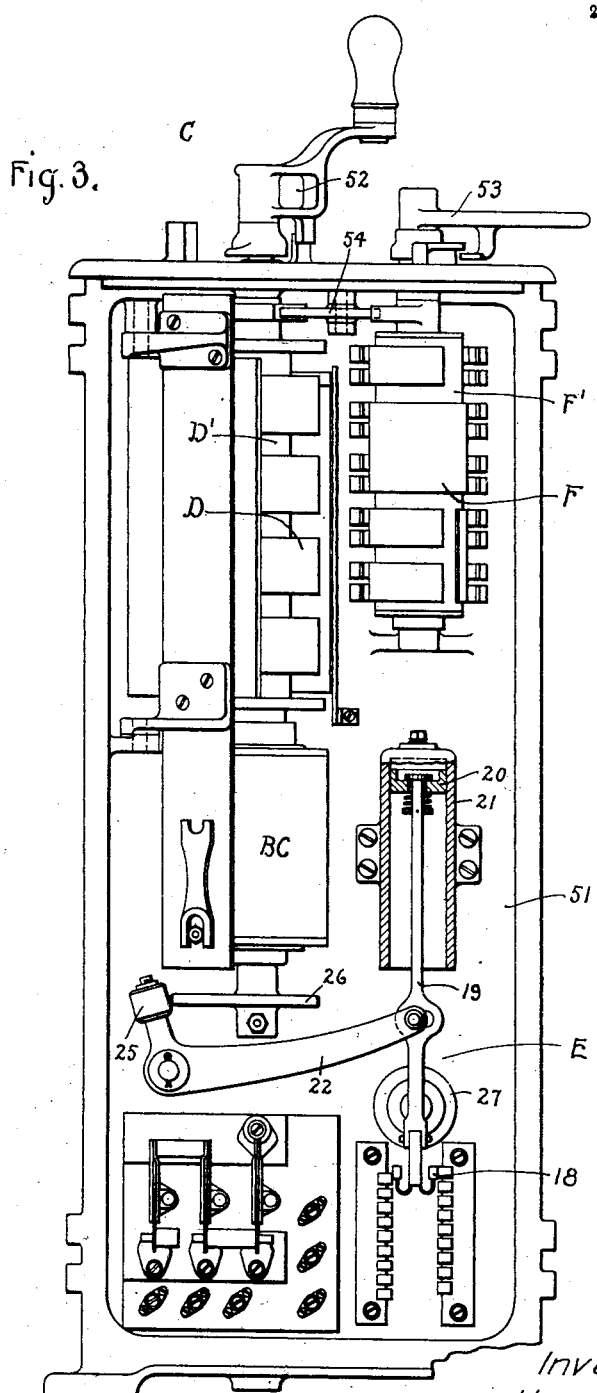

HAROLD E. WHITE, OF SCHENECTADY, NEW YORK, ASSIGNOR TO GENERAL ELECTRIC COMPANY, A CORPORATION OF NEW YORK.

MOTOR-CONTROL SYSTEM.

No. 917,222.      Specification of Letters Patent.      Patented April 6, 1909.

Application filed August 17, 1906. Serial No. 331,003.

*To all whom it may concern:*

Be it known that I, HAROLD E. WHITE, a citizen of the United States, residing at Schenectady, county of Schenectady, State of New York, have invented certain new and useful Improvements in Motor-Control Systems, of which the following is a specification.

The present invention relates to control systems for electric motors and particularly systems wherein the speed of the motors is governed by controlling the main generator so as to vary the characteristics of the current delivered to the motors; and it has for its object to improve such systems.

My invention is especially adapted for use in connection with electrically propelled cars wherein the current for the motors is furnished by a generator driven by an oil or gas engine, and it may, in one aspect, be considered as providing means for making the control of the motors in such systems automatic or semi-automatic in character.

To the above ends my invention consists in a novel construction and arrangement of parts to be hereinafter particularly pointed out in the claims.

For a full understanding of my invention reference is to be had to the following detailed description taken in connection with the accompanying drawing which illustrates a preferred form of the invention.

In said drawing, Figure 1 indicates diagrammatically a system arranged in accordance with the present invention and adapted for use in operating a car or locomotive; Fig. 2 illustrates a car provided with the equipment shown in Fig. 1; Fig. 3 is a front view of the main controller with the casing removed; and Fig. 4 shows the interlock between certain of the switches.

Referring to Figs. 1 and 2, M and $M^1$ are the motors of a two-motor equipment, these motors being illustrated as series motors, although they may be of any desired type. G is a main generator which, in the present instance, is driven by a prime mover H which may be in the nature of an oil or gas engine. $g$ is an auxiliary generator for exciting the main generator. C and $C^1$ are controllers, from either of which the system may be governed; these controllers being placed at opposite ends of the car or vehicle in order that the movement of the car or vehicle may be controlled from either end. Each controller is made up of three members, namely, a main line switch D, a resistance controlling switch E, and a switch F for connecting the motors in series or in parallel for either direction of rotation. The speed of the motors, when connected either in series or in parallel, is varied by varying the amount of the resistance R in the field circuit of the main generator. The voltage of the main generator may also be varied by means of the rheostat $r$ in the field circuit of the auxiliary generator $g$.

The switches D and F are of the usual cylinder type, while the switch E consists of a semi-automatic device, the position of which is controlled by the position of the cylinder of the main line switch, but the maximum speed of operation of which is determined by a suitable checking device, such as a dash-pot.

The switch D comprises the fixed contacts $d^1$ to $d^4$, and segments $d^5$ to $d^8$ carried by the rotating cylinder. The combined reversing and series-parallel switch consists of two rows of fixed contacts $f^1$ to $f^5$, inclusive, and $f^6$ to $f^{10}$, inclusive, together with movable contacts $1^f$ to $9^f$, inclusive. The switch E comprises two rows of fixed contacts 1 to 9, inclusive, and 10 to 17, inclusive, together with a movable contact member 18 adapted to travel across the rows of fixed contacts and successively connect together corresponding ones. The contact member 18 is carried upon a stem 19 which has at its upper end a piston 20 movable within a cylinder 21. When free to do so, the piston descends slowly in the cylinder and causes the contact member 18 to travel from the position shown to the position wherein it bridges fixed contacts 9 and 17. The stem 19 is connected to the long arm 22 of a bell-crank lever 23. The short arm 24 of this lever has a roller 25 projecting into the plane of a disk-like cam 26 carried upon the shaft of the main line-switch D. When the switch D is in the position shown, the cam 26 maintains the lever 23 in such position that the piston 20 is kept at the upper end of the cylinder 21 and the contact member 18 engages with fixed contact 1 of one row and a dead contact $1^a$ of the other row. As the main switch is turned into and through the various positions wherein the movable contacts engage with the fixed contacts at points indicated by the dotted lines extending parallel to the axis of the cylinder, no change is made in the circuits at the main switch but the cam 26 is rotated, freeing the arm 24 of the bell-crank lever and permitting the piston and movable contact member of the switch E to descend. There are seventeen such positions shown and therefore the switch E may be caused to operate step-by-step through sixteen different steps, since the cam 26 does not need to release the lever 23 until the controller reaches the second position. It will be noted that the movement of the switch-arm 18 between steps is governed by the dash-pot device, so that it is not within the operator's power to cause this switch member to travel faster than at a predetermined maximum rate of speed. If the main switch is brought to the second position, the switch E will operate through one step and be then stopped by the cam 26. If the switch D is brought to the last position, the movable member of the switch E is free to travel throughout its entire range of movement, subject to the influence of the dash-pot device. In the same way the main switch may be brought to any intermediate position and the movable member of the switch E will gradually assume a corresponding position and then be brought to rest by means of the cam. The fixed contacts 1 to 17, inclusive, are connected to corresponding taps on the main resistance R, and the function of the switch E is to cut out this resistance section by section as the movable member thereof travels downward. There is a further governing device associated with the switch E; this consisting of an electro-magnet 27 which, when energized, attracts the stem 19, or an armature carried by the stem, and locks the movable contact member 18 in any position which it may then be occupying. This electro-magnet is controlled by a throttle relay 28, the actuating coil of which is in the armature circuit of the main generator. Thus, when the current which is being supplied to the motor passes beyond the desired maximum limit, the throttle relay operates to stop the switch E and therefore prevents the field excitation of the main generator from being further increased until the current drops again below the predetermined maximum.

Assuming the generators to be in operation; the switch 29 to be closed; and the switch 30 occupying the position indicated: current flows from the left-hand terminal of the armature of the auxiliary generator, through the field coils of the main generator, through all of the resistance R, and thence, by way of conductor 31, back to the right-hand terminal of the auxiliary generator. The field excitation of the main generator is now at its weakest, and therefore the current generated by the main generator is low in voltage. The car may now be started in one direction or the other by turning the switch F to the right or to the left (assume it to be to the left), and bringing the main switch D to its first running position. The switch E is not yet released and therefore remains stationary. A circuit may now be traced from the left-hand terminal of the main generator, through switch 30, conductor 32, contacts $d^4$, $d^8$, $d^7$ and $d^3$ of the main switch, to conductor 33, field winding of motor $M^1$, conductor 34, contacts $f^8$, $8^f$ and $f^9$ of switch F, through conductor 35, through the armature of motor $M^1$, through conductor 36, through contacts $f^7$ $7^f$, $9^f$ and $f^{10}$ of the switch F, through conductor 37, thence through the field winding of motor M, through conductor 38, through contacts $f^3$, $2^f$ and $f^2$ of switch F, through conductor 39, through the armature of motor M, through conductor 40, through contacts $f^4$, $3^f$, $1^f$ and $f^1$ of the switch F, through conductor 41, through contacts $d^1$, $d^5$, $d^6$ and $d^2$ of the main switch, through blow-out coil BC associated with the main switch, through conductor 42, through the actuating winding of throttle relay 28, to the right-hand terminal of the main generator. The motors are therefore connected across the terminals of the main generator in series with each other. In order to increase the speed of the motor, the switch F is left stationary and the switch D is brought to the second running position. This operation of the main switch brings the cam 26 to such position that the contact arm 18 of the switch E is permitted to drop so as to bridge contacts 1 and 10. The field circuit of the main generator is now from the left-hand terminal of the auxiliary generator, through the field winding of the main generator, through resistance R to tap 43, thence through contacts 10, 18 and 1 of switch E, back to tap 44 on the resistance, and thence through the remaining portion of the resistance at the left-hand, through the conductor 31 and back to the right-hand terminal of the auxiliary generator. It will be seen that that portion of the resistance between taps 43 and 44 is now cut out and therefore the field of the main generator is strengthened somewhat, so that this generator now supplies current at an increased voltage. This increase in voltage causes the motors to run to somewhat higher speed. In the third running position of the main switch, contact 18 of switch E is caused to bridge contacts 10 and 2 and the current in the field circuit, after leaving contact 10, passes through contact 18, to contact 2, and thence to tap 45 on the resistance, to conductor 31, and back to the right-hand side of the auxiliary generator. An additional amount of resistance, namely, that portion between taps 44 and 45, has now been eliminated and therefore the voltage of the main generator and consequently the speed of the motors is again increased. In this same way the entire resistance in the field circuit of the main generator may be removed step-by-step by turning the main controller gradually through its successive running positions, or the main controller may in the first instance be brought into its final position, whereupon the resistance in the field circuit will be cut out gradually, subject only to the retarding influence of the dash-pot. If at any time, however, too much current is being supplied to the motors, the throttle relay is operated and current flows from the left-hand terminal of the auxiliary generator through contacts 46 on the throttle relay, through conductor 47, through electro-magnet 27, and thence back to the right-hand terminal of the auxiliary generator. The electro-magnet 27, being thus energized, locks the switch E in the manner previously described.

In order to operate the motors in parallel, the main switch D is first brought to the "off" position so as to reinsert all of the resistance in the field circuit of the main generator as well as open-circuit the motors, and then switch F may be moved a further step in the same direction (to the left) as before; so that, when the main switch is again operated, the circuit of the motors is as follows: from the left-hand terminal of the main generator, through switch 30, through wire 32, through contacts $d^4$, $d^8$, $d^7$ and $d^3$ of the main switch, to a point 48 where the circuit branches, one branch extending through conductor 33, through the field winding of motor $M^1$, conductor 34, contacts $f^8$, $8^f$ and $f^9$, through conductor 35, through the armature of motor $M^1$, through conductor 36, through contacts $f^7$, $6^f$ and $f^6$ of switch F, through contacts $d^1$, $d^5$, $d^6$ and $d^2$ of the main switch, and then through the blow-out coil back to the right-hand side of the generator, as before. The second branch from point 48 is through conductor 49, through contacts $f^5$, $5^f$ and $f^{10}$ of switch F, through conductor 37, then through the field winding of motor M, through conductor 38, through contacts $f^3$, $2^f$ and $f^2$ of switch F, through conductor 39, through the armature of motor M, through conductor 40, through contacts $f^4$, $3^f$, $1^f$, $f^1$ of switch F, through contacts $d^1$, $d^5$, $d^6$ and $d^2$ of the main switch, through the blow-out coil, as before, and back to the right-hand side of the generator. Further operation of the main controller then effects the elimination of the resistance from the field circuit of the main generator in the manner previously described.

To reverse the direction of rotation of the motors and therefore the direction of movement of the car or other vehicle, the switch F is moved toward the right from the position shown, and the operation of the entire controller is then the same as before, except that the relative connections between the field and armature windings of the motors are changed.

In Fig. 3, the controller C, as actually constructed, is shown. All the parts may conveniently be mounted within a casing 51: the operating handles 52 and 53 for the switches D and F, respectively, being arranged above the top of this casing. An interlock 54 is preferably provided between the cylinders $D^1$ and $F^1$ of the switches D and F, respectively, whereby the switch F cannot be brought into the parallel position without first returning the switch D to the "off" position. This interlock may conveniently comprise a disk 55 carried by the rotating element of the main switch and having a notch 56, together with a notched disk 57, on the movable element of the series-parallel switch, and a dog 58 arranged to coöperate with the notches in both disks. When the dog 58 engages notch 56 and also notch 59, the main switch is held against rotation, but the switch F may be operated thereby, by causing the dog to be forced farther into the notch 56 against the tension of spring 60. When the dog 58 enters any one of the notches 61, 62, 63 or 64 in the disk 56, the spring 60 withdraws the dog from the notch 56 in the other disk and leaves the main switch free to be moved. As soon as the notch 56 has been rotated out of registration with the end of the dog, the series-parallel switch is locked and cannot be rotated until the main switch is again brought to the "off" position.

Although I have described my invention in detail as embodied in its preferred form, I do not desire to be limited to the particular form shown, since the construction and arrangement of parts illustrated may be varied without departing from the scope of my invention, as indicated by the appended claims.

What I claim as new, and desire to secure by Letters Patent of the United States, is,—

1. In an electrically-operated car, an engine carried by said car, a generator driven thereby, car-propelling motors arranged to be connected in circuit with said generator, an adjustable resistance in the field circuit of said generator and a control system comprising a line-switch for completing the circuit connections between the generator and motors, a resistance-controlling switch operating automatically to reduce the resistance in the field circuit of the generator, and means controlled by the position of the line-switch for determining the extent of movement of the resistance controlling switch.

2. In an electrically-operated car, an engine carried by said car, a generator driven thereby, car-propelling motors arranged to be connected in circuit with said generator, an adjustable resistance in the field circuit of the said generator, and a control system comprising a resistance controlling switch arranged to operate automatically to cut out the resistance in the field circuit of the generator, a line switch for completing the circuit connections between the generator and the propelling motors, said line-switch having an extended movement after the circuit is closed, and means controlled by the extent of movement of said switch for determining the extent of movement of the resistance-controlling switch.

3. In an electrically-operated car, an engine carried by said car, a generator driven thereby, car-propelling motors arranged to be connected in circuit with said generator, an adjustable resistance in the field circuit of the said generator, an automatically-operated resistance-controlling switch in the field circuit of said generator, a line-switch for completing the circuit between the generators and motors, and a single handle for controlling the operation of both switches, the parts being so connected and arranged that movement of said handle into any one of its running positions operates to close the line-switch and to determine the extent of movement of the resistance-controlling switch.

4. In an electrically-operated car, an engine carried by said car, a generator driven thereby, car-propelling motors arranged to be included in circuit with said generator, an adjustable resistance in the field circuit of said generator and a control system comprising a rotary line-switch provided with contacts arranged to complete the circuit between the generators and motors when the switch is moved from its "off" position and thereafter to maintain said circuit closed throughout the movement of the switch, an automatically-operated switch arranged to cut out the resistance in circuit with the generator field, and connections between the line-switch and the resistance-controlling switch so arranged that the position of the line-switch determines the extent of movement of the automatically operating resistance-controlling switch.

5. In an electrically-operated car, an engine carried by said car, a generator driven thereby, car-propelling motors arranged to be connected in circuit with said generator, an adjustable resistance in the field circuit of said generator arranged to give a voltage suitable for starting when it is included in the circuit and a voltage suitable for running when it is out of circuit, and a control system comprising a line-switch for completing the circuit connections between the generators and motors, a resistance-controlling switch arranged to operate automatically to cut out the resistance in the field circuit of the generator, and connections between the line-switch and the resistance-controlling switch arranged to prevent the resistance-controlling switch from operating until after the circuit connections between the generator and motors has been completed at the line-switch.

6. A controller, comprising a manually-operated line-switch having an extended movement from its "off" position and provided with contacts for closing a main circuit and keeping the said circuit closed throughout the movement of the switch, an automatically-operated resistance-controlling switch located adjacent to said main switch, and a cam operated by the main switch and arranged to permit a predetermined movement of the resistance-controlling switch when the main switch is moved a certain amount in one direction and to return the resistance-controlling switch to its initial position when the main switch is returned to its "off" position.

7. In combination, a motor, a generator for supplying current to the motor, a controller for increasing the field strength of the generator in order to increase the speed of the motor, and an electro-responsive device for locking said controller when the current supplied to the motor reaches a predetermined maximum value.

8. In combination, a motor, a generator for supplying current to the motor, a controller for varying the potential of the current supplied by the generator, means for causing said controller to operate to gradually increase the potential of said current in order to accelerate the motor, and electro-responsive means arranged to stop the operation of said controller when the current reaches a predetermined maximum value.

9. In combination, a motor, a generator for supplying current to the motor, a resistance in the field circuit for said generator, a switch for gradually eliminating said resistance, and an electro-responsive device controlled by the motor current for locking said switch when the motor current reaches a predetermined value.

10. In combination, a motor, a generator for supplying current to the motor, a resistance in the field circuit of said generator, a switch tending normally to cut out said resistance, manually controlled means for operating said switch to cut in said resistance, and a checking device for causing said switch to operate gradually when eliminating said resistance.

11. In combination, a motor, a generator for supplying current to the motor, a controlling device tending normally to operate to increase the voltage of the generator, a manually-controlled stop for limiting the movement of said controlling device and for operating it in the direction to decrease the voltage of the generator, and a checking device for retarding the operation of said controlling device in the direction to increase the voltage.

12. In combination, a plurality of motors, a generator for supplying current to said motors, a switch having a position in which it connects the motors in series and another position in which it connects the motors in parallel, a second switch for varying the voltage of the current supplied by the generator, and means associated with said switches for preventing the one switch from being moved from the series position to the parallel position except when the second switch is in a predetermined position.

13. In combination, a plurality of motors, a generator for supplying current to said motors, a series-parallel switch, a switch for controlling the voltage of the generator, and means associated with said switches for preventing said series-parallel switch from being moved from the series position to the parallel position except when the other switch is in a position for causing the generator to deliver current at a low voltage.

14. In combination, a plurality of motors, a generator for supplying current to said motors, a resistance in the field circuit of the generator, a series-parallel switch, a switch for eliminating said resistance from the field circuit, and means associated with said switches for preventing the series-parallel switch from being brought from the series position to the parallel position except when the other switch is in a position wherein said resistance is in circuit.

15. In combination, a plurality of motors, a series parallel switch, a switch for varying the speed of the motors when connected either in series or in parallel, and a switch for connecting the motors to the source of current, means associated with the latter switch for governing the operation of said speed-varying switch, and means for locking the series-parallel switch when the said speed-varying switch is in an intermediate position.

16. In a controller, a line-switch, a series-parallel switch, a speed-controlling switch, means associated with the line-switch for governing the speed-controlling switch, and means for preventing the operation of the series-parallel switch except when the speed-controlling switch is in a predetermined position.

17. In a controller, a line switch, a series-parallel switch and a speed-controlling switch, said speed-controlling switch tending to move in one direction and having a dash-pot for limiting the rate of movement in such direction, and a stop associated with the line-switch for moving said speed-controlling switch in one direction and limiting the extent of its movement in the other direction.

18. In a controller, a speed-controlling switch tending to move in one direction and having a dash-pot for limiting the rate of such movement, a main switch having a stop for moving the speed-controlling switch in one direction and limiting the extent of its movement in the other direction, a series-parallel switch, and locking means between said switches for preventing the operation of the series-parallel switch except when the speed-controlling switch is in a predetermined position.

19. In combination, a plurality of motors, a generator for supplying current to the motors, a series-parallel switch for said motors, a switch for connecting the motors to said generator, a switch for varying the voltage of the current supplied by the generator, and means for preventing the operation of said series-parallel switch except when the line-switch is open and the voltage controlling switch is in a position wherein the current supplied by the generator has a low voltage.

20. In combination, a plurality of motors, a generator for supplying current to the motors, a series-parallel switch for the motors, a line-switch for connecting the motors to the generators, a resistance in the generator field, a switch for cutting out said resistance, and means associated with said switches for locking the series-parallel switch against operation except when the line-switch is open and the resistance-controlling switch is in the position wherein the resistance is in circuit.

In witness whereof, I have hereunto set my hand this 16th day of August, 1906.

HAROLD E. WHITE.

Witnesses:
 BENJAMIN B. HULL,
 GRACE M. HANIGAN.